(12) United States Patent
Basson et al.

(10) Patent No.: US 8,312,379 B2
(45) Date of Patent: Nov. 13, 2012

(54) METHODS, SYSTEMS, AND COMPUTER PROGRAM PRODUCTS FOR EDITING USING AN INTERFACE

(75) Inventors: Sara H. Basson, White Plains, NY (US); Nelson Correa, Sleepy Hollow, NY (US); Genady Grabarnik, Scarsdale, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 11/843,092

(22) Filed: Aug. 22, 2007

(65) Prior Publication Data
US 2009/0055761 A1 Feb. 26, 2009

(51) Int. Cl.
*G06F 3/00* (2006.01)
*G06F 3/048* (2006.01)
(52) U.S. Cl. ......... 715/747; 715/764; 715/708; 715/810
(58) Field of Classification Search .................. 715/747, 715/708, 810, 764; 707/104.1
See application file for complete search history.

(56) References Cited

U.S. PATENT DOCUMENTS

| | | | |
|---|---|---|---|
| 6,665,644 B1 | 12/2003 | Kanevsky et al. | |
| 6,792,143 B1* | 9/2004 | Harmovaara | 382/189 |
| 2004/0225654 A1* | 11/2004 | Banavar et al. | 707/6 |
| 2005/0071167 A1* | 3/2005 | Levin et al. | 704/272 |
| 2006/0010206 A1* | 1/2006 | Apacible et al. | 709/205 |
| 2006/0036945 A1* | 2/2006 | Radtke et al. | 715/708 |
| 2007/0150279 A1* | 6/2007 | Gandhi et al. | 704/258 |
| 2008/0027924 A1* | 1/2008 | Hamilton et al. | 707/5 |
| 2008/0119235 A1* | 5/2008 | Nielsen et al. | 455/566 |
| 2009/0055737 A1* | 2/2009 | Borchardt et al. | 715/708 |
| 2010/0114562 A1* | 5/2010 | Hutchinson et al. | 704/9 |

OTHER PUBLICATIONS

Microsoft Corp, Microsoft Word 2003 Non-Patent Literature, 2003, Microsoft Corp, pp. 1-8.*

* cited by examiner

*Primary Examiner* — Nicholas Augustine
*Assistant Examiner* — Erik Stitt
(74) *Attorney, Agent, or Firm* — Cantor Colburn LLP; Ann Dougherty

(57) ABSTRACT

Methods, computer program products, and systems for editing using an interface for selecting and presenting editing tools are described. An input document is received for editing. A strategy for editing the document is identified. Editing tools are selected to edit the document, and the selected editing tools are presented.

20 Claims, 4 Drawing Sheets

FIG. 3

METHODS, SYSTEMS, AND COMPUTER PROGRAM PRODUCTS FOR EDITING USING AN INTERFACE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

Exemplary embodiments of this invention relate to editing and particularly to editing errors in transcription and/or translation.

Increased bandwidth availability for web and cell phone applications has resulted in proliferating audio and video data. The increased quantities of audio and video information result in correspondingly increasing requirements for transcription capability. Transcription of audio ensures that the multimedia materials are accessible to all users, including users that are deaf or hard of hearing. Transcription also enables users that are "situationally disabled" to gain access to needed information, for example, users with access to only low bandwidth transmission capability can read text streams even when full bandwidth video is not an option. Transcription of audio is also a prerequisite for providing a number of other high-value capabilities, such as translation, summarization, and search.

Manual transcription options remain expensive and require highly skilled and scarce labor forces such as stenographers. Automated speech transcription is steadily improving, with word error rate reductions of as much as 30% per annum on specific data types. Nonetheless, full transcription availability of unlimited domain audio materials remains a distant goal. For example, current speech automation transcription rates for broadcast news presented by a single talker are approximately 80%. Accuracy rates with multiple speakers, under degraded audio conditions, are considerably worse.

There is a gap between speech automation performance and acceptable transcription requirements for captioning. As a result, speech technology is not incorporated in captioning processes, and expensive manual procedures are chosen instead. This situation results in another gap in which most audio and video information that is generated remains untranscribed, untranslated, unsummarized, and unable to be searched.

One standard methodology for enhancing speech-automated outputs includes human editing of erred results. While promising in principle, this has demonstrated limited value. A speech-automated transcript of one hour of audio with an 80% text accuracy rate requires 5 hours of human editing, using current methods, in order to achieve perfect accuracy. Similar challenges exist for machine translation that is supplemented by human editors. The multiple hours of editing that are demanded reduce the attractiveness of incorporating automatic speech recognition or machine translation into these processes. In order to advance speech recognition and machine translation as viable options, the accuracy of these tools must increase and/or the burden and expense of editing and repair must decrease.

It would be desirable to have a bridge between what speech automation technology can currently handle, and what can best be handled through human mediation. It is also desirable to exploit the human component most efficiently and most cost-effectively, while simultaneously enhancing the speech automation technologies.

SUMMARY

Exemplary embodiments include a method of editing. An input document is received for editing. A strategy for editing the document is identified. Editing tools are selected to edit the document. The selected editing tools are presented.

Further exemplary embodiments include a system for editing using an interface for selecting and presenting editing tools. The system includes a processor for executing instructions, and a display. Also, the system includes an interface configured to determine a strategy for editing a document via the processor. The interface selects editing tools in accordance with the strategy, and the interface presents editing tools to a user on the display.

Additional exemplary embodiments include a computer program product, tangibly embodied on a computer readable medium, for editing. The computer program product includes instructions for causing a computer to execute a method in which an input document is received for editing. A strategy for editing the document is identified. Editing tools are selected to edit the document. The selected editing tools are presented.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Figure 1:
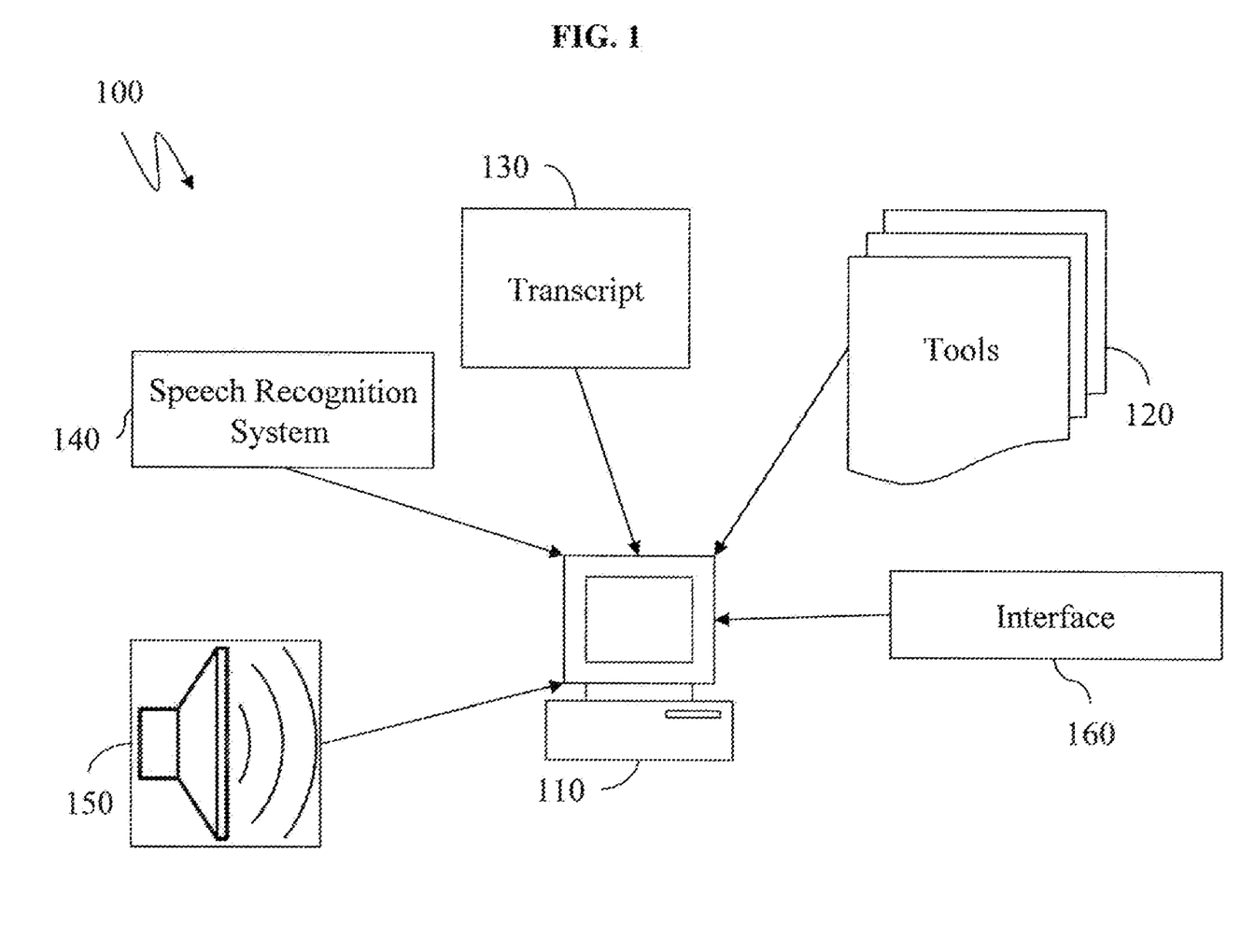
FIG. 1 illustrates an exemplary system for implementing processes in accordance with exemplary embodiments.

Turning now to the drawings in greater detail, it will be seen that FIG. 1 illustrates an exemplary system for implementing processes in accordance with, exemplary embodiments.

The system 100 includes a device (e.g., a general purpose computer) 110 that includes a processor executing computer program code stored on a storage medium [not shown] in order to perform the processes described herein. It is understood that other processor-based devices (e.g., personal digital assistants, wireless phones) may implement the exemplary processes described herein. Thus, exemplary embodiments are not limited to personal computers. It is understood that the device 110 may be operatively connected to other devices such as printers, scanners, and keyboards (or a mouse), and operatively connected to a network (such as the Internet).

The system 100 uses tools 120 (which are a plurality of editing tools that may include tools T0, T1, T2, T3, T4, T5, and T6) to enhance the speed of editing documents, translations, and transcriptions, such as transcript 130. The system 100 discussed herein is not limited to tools 120 and may utilize other editing tools currently applied in the art. Moreover, tools T0, T1, T2, T3, T4, T5, and T6 are just a subset of the editing tools that may be used to edit the transcript 130, and other editing tools may be used in implementing exemplary embodiments discussed herein.

In a non-limiting example, the transcript 130 may have been transcribed by a speech recognition (SR) system 140 from audio 150. The SR system 140 may be any speech automation technology capable of outputting transcript 130. The SR system 140 transcribes audio 150 in any format. The audio 150, for example, may be recorded, live, slightly delayed, and/or any combination thereof and may be from video or include sound from video. The audio 150 and video may be in any format known in the art. In another non-limiting example, the transcript 130 may be the translation computed by a machine translation (MT) system from an input text.

In exemplary embodiments, an interface 160 can ascertain which tool or set of tools 120 should be used to edit transcript 130, and present a tool or set of tools 120 to the user (e.g., the editor). The determination of which tools 120 (which may be tools T0, T1, T2, T3, T4, T5, and T6, and/or any other editing tools) to present to the user may be based on numerous factors, including the characteristics of the transcript 130 and/or of the user editing the transcript 130. The factors may also include the skill level of the user, the subject matter of the transcript 130, the time available for editing the transcript 130, the time that each one of the editing tools 120 requires to make corrections to the transcript 130, the nationality of the user, and the efficiency of the editing tools 120 (the efficiency may be based on training data for the editing tools 120).

In a non-limiting example, the interface 160 determines that tools T0 and T2 should be used to edit a particular transcript 130. Accordingly, the interface 160 presents tools T0 and T2 (e.g., in a wizard) to the user as editing tools to edit the transcript 130. In other words, the interface 160 can present to the user the best options, which may be using one tool (e.g., tool T0 of the tools 120) on a certain portion of the transcript 130 and another tool (e.g., tool T2 of the tools 120) on a different portion of the transcript 130. In response to the tools presented by the interface 160, the user may choose to use any one or all of the tools identified by the interface 160 to edit the transcript 130.

In accordance with exemplary embodiments, the interface 160 presents the best option(s) to the user at every moment, so that the user knows which tool of tools 120 is the best to use, and the user does not have to search through the tools 120. As non-limiting examples, the system 100 via the interface 160 selects which tool of tools 120 is the best to use for the user at each point during editing of transcript 130. In exemplary embodiments, the interface 160 determines a sequence of tools 120 to edit the transcript 130 in accordance with various factors.

In exemplary embodiments, the tool T0 assumes that some text analytics are done on the transcript 130 to identify the transcript topic (e.g., the subject matter topic, what is the transcript 130 about). Text analytics are done to perform named entity (NE) and terminology detection and identification. The named entities, by way of non-limiting examples, may include people, places, time, money, companies, products, pronouns, etc. The terminology may include special terms about the topic or subject matter being discussed on the transcript 130. Examples of terminology include terms from different fields, such as "power of attorney" in the legal field, "mortgage-backed securities" in the financial field, and "XML" or "Extensible Markup Language" in the information technology field.

The task for the exemplary editing tools 120 is to provide human editing correction, for both speech recognition errors and translation errors produced by SR system 140 or by machine translation. When the user operates tool T0, tool T0 displays a ranked list of topics, named entities (NEs), and terminology for the transcript 130. Tool T0 may be operated by the user with or without the audio 150. As such, the user may utilize the tool T0 edit the transcript 130 without having to listen to the audio 150, or the user may choose to listen to the audio 150. The tool T0 associates a confidence score $C(T\_0, W)$ with each label of the transcript 130. With regard to the confidence score, $T\_0$ identifies the tool (i.e., the tool $T\_0$) being used, and W is the potential error in the transcript 130. More concerning the confidence score is discussed herein. Additionally, for each NE and terminology item, the tool T0 includes links to the identified words or sentences having the potential errors W in the text of the transcript 130.

The user (e.g., the editor) will be able to correct any or all of the topic, NE, and terminology transcriptions, and the links to the identified words or sentences in the source (e.g., transcript 130). These edits can be quite powerful, since they are semantically related, not word-based, and can impact multiple instances of words in the text. For example, in the case of misrecognition of a person's name that is mentioned multiple times in the transcript 130 (e.g., "Candice Agree," a WQXR radio station announcer, misrecognized as "can't disagree"), a single correction by the user of any occurrence of the name may be used by tool T0 to automatically correct all other occurrences of that name in the transcript. A single correction to an identified word in the transcript 130 thus corrects many instances of the word.

Additionally, the models used in the tools 120 (e.g., in tool T0) can be adapted based on the corrections made by the user. In other words, the corrections (which may come from the suggestions of the tools 120) made by the user can be used to provide feedback to the tool T0, and the model of the tool T0 can be updated. As well, the model used in the SR system 140 may be updated with the feedback of the tools 120. In the example case of misrecognition of a person's name discussed above for "Candice Agree," the language model of the speech recognition system (e.g., SR system 140) may be adapted temporarily by increasing the unigram and bigram probability of the words "Candice" and "Agree" in the language model, for further transcription of the current input (e.g., audio 150).

Moreover, in accordance with exemplary embodiments, the tools 120 (e.g., tool T0) display, e.g., detected named entities or special terms in the entire document (or the portion seen so far), and offers the user (editor) a chance to correct his or her speech recognized transcription or automatic (machine) translation (e.g., transcript 130), in one place and operation. If corrected, all document occurrences of the NE or term would also be corrected. Other tools T1 through 16 are described herein.

Figure 2:
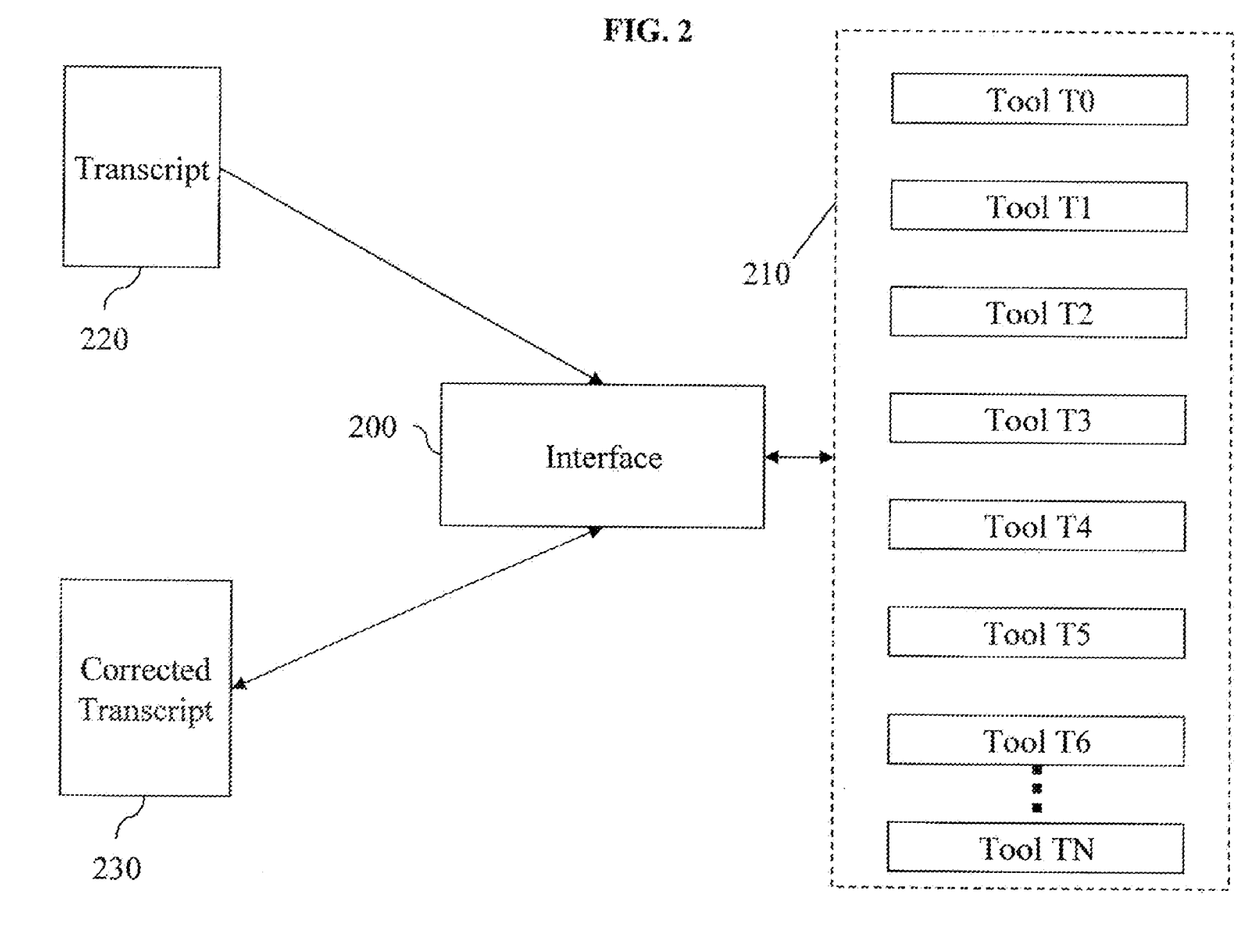
FIG. 2 illustrates a block diagram of an exemplary user interface that operates with editing tools in accordance with exemplary embodiments.

In accordance with exemplary embodiments, FIG. 2 illustrates a block diagram of an exemplary user interface that operates with editing tools. The interface 200 (or 160) allows the user to correct errors (e.g., which may be errors caused by the SR system 140 in transcribing the audio 150 and which may be referred to as decoding errors) in the transcript 220, and the interface 200 may be configured to satisfy predefined conditions such as requiring relatively small human intervention, providing high user satisfaction, etc. As a non-limiting example of the operations of the interface 200, consider an exemplary case in which a user (editor) edits speech recognition errors by viewing a decoded text in a window, and there is a potential error W in the transcript 220 that is identified using a confidence score $0<C<1$. Any of the tools T0-TN of tools 210 are available to correct potential errors W of the SR system 140.

Tool T1 displays a list of alternative words L (without playing audio 150) corresponding to the potential error W which may be, e.g., a decoded word in the text of the transcript 220. A confidence score $C(T\_1, W)$ is associated with each word in the list of alternative words L (which makes the assumption that the correct word is located in the list of alternative words L).

Tool T2 displays an N-best list of decoding sentences corresponding to a potential error W (without playing the audio). A confidence score $C(T\_2, W)$ is associated with each of the decoding sentences in the N-best list (which makes the assumption that the correct word is located in the N-best list).

Tool T3 displays an orthographic phonetic representation corresponding to the potential error W. A confidence score $C(T\_3, W)$ is associated with the orthographic phonetic representation, assuming that the orthographic phonetic representation correctly matches the potential error W.

Tool T4 displays a list of alternative words L corresponding to the potential error W by playing the audio (e.g., audio 150). Tool T5 displays an N-best list of decoding sentences corresponding to the potential error W by playing the audio. Tool T6 is to listen to the audio. The decoded word or decoded sentence is part of the text of the transcript 220. The potential error W may be a decoded word or decoded sentence that is identified as an error in the transcript 220.

The tools 210 require different amounts of time for a user (editor) to operate. As a non-limiting example, assume for simplicity that the tool T1 is the fastest and the tool T6 is the most time consuming, but the tool T1 has a higher probability that the correct word is not chosen from (or included in) the list of alternative words L, and tool T6 guarantees that the correct word will be chosen. In further explaining features of the interface 200 (160), the following statistical problem is set forth.

In exemplary embodiments, the user editing interface 200 may be modeled as a sequence of observations $O=o\_1\ o\_2 \ldots o\_k$ associated with a displayed transcribed text of the transcript 220 and produced by an unobservable "true" state sequence $S=s\_1\ s\_2 \ldots s\_k$ that is a correct reference text associated with the transcribed text of the transcript 220. The transcribed text may be a word or sentence of the transcript 220, and the transcript 220 is produced, e.g., by the SR system 140 from the audio 150. The correct reference text is the text of the transcript 220 that will replace the potential error W, and once the transcript 220 has been edited, the transcript 220 may be referred to as the corrected transcript 230. Indeed, it is understood that the corrected transcript 230 is for explanatory purposes and the corrections can be made directly to the transcript 220 itself without having a separate document such as transcript 230.

In the sequence of observations, each observation $o\_i$ is described as follows: $o\_i$ contains features that are observed on a display (of e.g., device 110) by a user (like a part of text in a window, e.g. a decoded word $W\_j$ and/or a confidence score $C(T\_1, W\_j)$ of the decoded word $W\_j$) in exemplary embodiments. Also, $o\_i$ contains some features (e.g. confidence scores $C(T\_i, W\_j)$) that are stored in a system memory.

For each pair of states $(o\_i, s\_i)$, a tool $t\_i$ is associated with the following properties. As non-limiting examples, application of the tool $t\_i$ to the observed state $o\_i$ generates a correct textual segment of the reference text $s\_i$ (e.g. a correct word). Also, application of the tool $t\_i$ satisfies a predefined set of conditions (e.g. the fastest among other tools that also generate the correct textual segment, or requires less editor attention). In other words, the tool $t\_i$ is chosen if it satisfies some set of conditions and corrects the potential error W in $o\_i$.

In accordance with exemplary embodiments, a sequence of tools $t\_1, t\_2 \ldots t\_k$ associated with $(o\_1, s\_1) \ldots (o\_k, s\_k)$ is denoted as T. With this framework, the user interface "recognition" system (e.g., interface 200) is to find a sequence T' of interface tools (e.g., tools 210) with the maximum posterior probability. The posterior probability means the probability after applying the system, and the maximum posterior probability means the maximum possible value of the posterior probability given an observed sequence $O=o\_1\ o\_2 \ldots o\_k$. In other words, $T'=\mathrm{argmax}\_\{T\}\ \mathrm{Prob}(T,O)$. T' is the value of the argument of the Prob(T,O) such, that function Prob(T,O) reaches maximum value in the point T' for some value of O.

In training data (referred to in FIG. 3), an exemplary set of tools, observations, and states $(t\_i, o\_i, s\_i)$ can be found that satisfies the requirements, such as to detect a correct word, require small human intervention, provide high user satisfaction, etc. The training process further discussed in FIG. 3 may be regarded as supervised learning.

As non-limiting examples, direct modeling (e.g., Maximum Entropy (ME)) can be used to estimate the conditional distribution Prob(T, O) using the training data described herein. ME modeling is based on the principle of avoiding unnecessary assumptions. The mathematical interpretation of the ME principle results in a constrained optimization problem of maximizing the entropy of the conditional distribution subject to given constraints.

The direct modeling of the interface 200 allows for different factors to be incorporated. For example, one can introduce a multitude of factors such as user (e.g., editor) characteristics (age, attention, skills, nationality, etc.), environment characteristics (working in office, at home, in a car, etc.), efficiency of the respective editing tools, time each of the editing tools requires to make corrections to the document, subject matter of the document, required time for editing the document, cost of editing, user history, audio quality, and/or other factors such as multiple editors and hierarchical tasks (e.g. speech and translation). Furthermore, as non-limiting examples, factors may also include user biometrics such as the skill level of the user, the nationality of the user, the accent of the user, the age of the user, the gender of the user, the native language of the user, the socioeconomic classification of the user, the educational level of the user, and the emotional state of die user. More discussion of user biometrics is disclosed in U.S. Pat. No. 6,665,644, filed Aug. 10, 1999, which is assigned to IBM®, and the disclosure of which is expressly incorporated herein by reference for all purposes.

Factors such as these can be inputted (e.g., with a keyboard, mouse, microphone) in the interface 200, and/or the factors may be downloaded from a storage medium. The interface 200 can select the best tool 210 or group of tools 210 for the user correcting the transcript 220 based on these and other factors.

Further, in accordance with exemplary embodiments, the interface 200 can identify the user, e.g., via user biometrics, such that the interface 200 can select the best tools 210 for the user. Also, the user may input certain information (e.g., a user name), and the user's profile can be applied to select the best tools 210. The user profile may include any user preferences that the user has for editing documents and factors specific to the user (e.g., user biometrics). Since there may be several users editing with the interface 200, the interface 200 can access the user profile (which may be stored in a storage medium) for each user, such that the selection of the tools 210 is tailored to what is best for the specific user.

Figure 3:
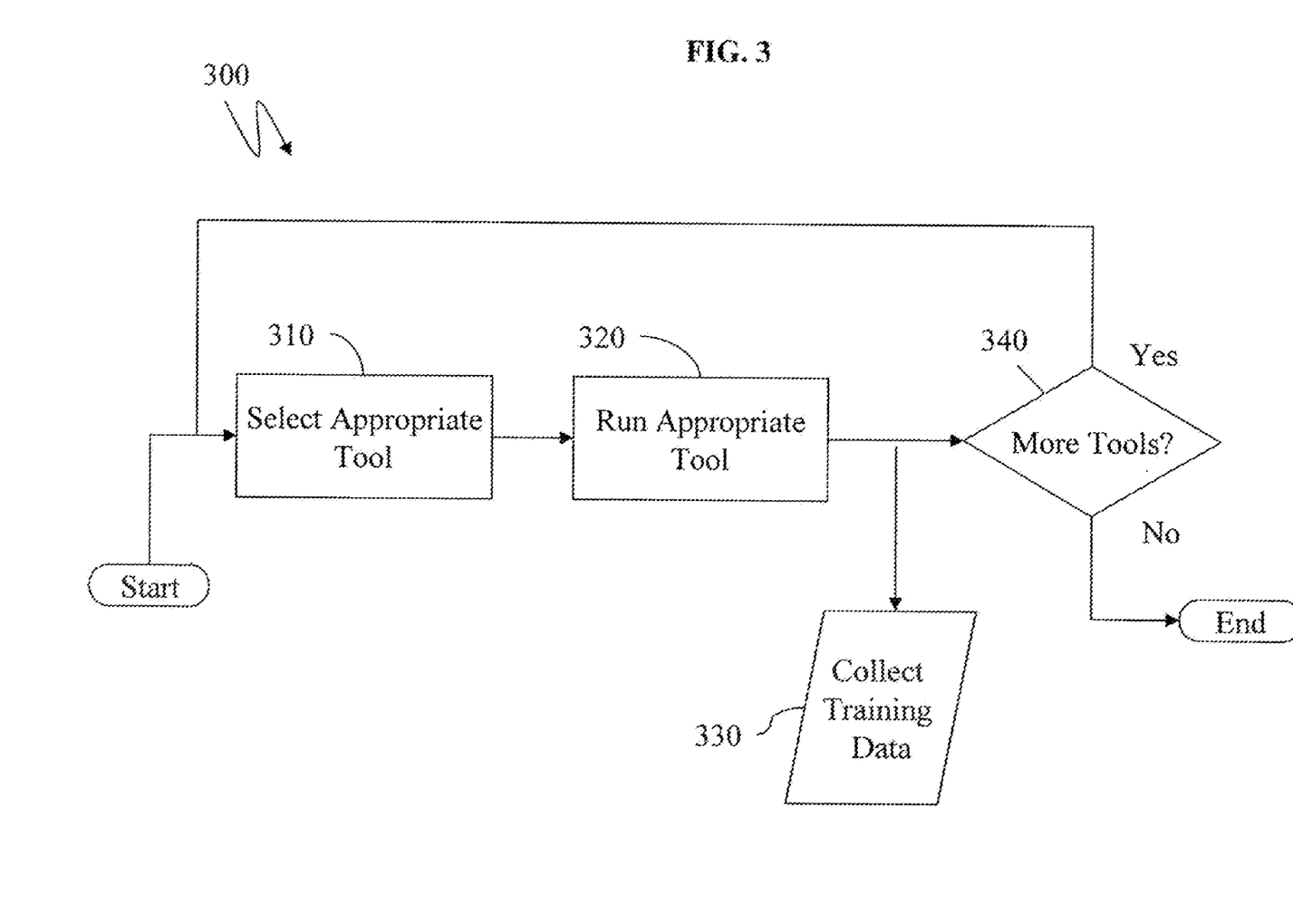
FIG. 3 illustrates a block diagram of a training process in accordance with exemplary embodiments.

FIG. 3 illustrates a block diagram of a training process 300 in accordance with exemplary embodiments. The tools 210 may include, e.g., the tools T0-T6 that each provides an annotation. Each tool of tools 210 may provide a different set of annotation information. Annotation as discussed herein may include additional information that explains or clarifies the main information. Non-limiting examples of annotations for a text document may include parts of speech (such as nouns, verbs, pronouns, etc.) and grammatical function of the word (like object, subject, verb, etc.). Non-limiting examples of annotation for voice information maybe transcription or translation of subtitles translating voice on another language. During the training process 300, a training corpus is assumed with reference annotations for each tool 210. In exemplary embodiments, corrections for the errors in the training corpus have already been identified. The training corpus, as a non-limiting example, may be a transcript 220 with labels having a list of alternative words L, and/or an N-Best list of sentences for potential errors identified in the transcript 220. A tool is chosen at 310, and the tool is run to determine what statistics the tool has on different parts of the training corpus at 320. The training data of the tool is collected to determine how well the tool performed at 330, e.g., the training data may be compared against the corrected transcript 230. As non-limiting examples, one tool may perform better on a particular type of document, and another tool may perform better for certain subject matters. As non-limiting examples, one tool may perform better on transcripts for lectures, news broadcast, casual conversation, etc.

If there are more tools determined to be available at step 340, each tool is selected and run against the training corpus. If there are no more tools determined to be available at step 340, the training process ends.

In accordance with exemplary embodiments, the training process 300 determines how well a tool performs and how much the tool contributes to the editing process of the transcript 220. Training statistics of interest for each editing tool may include its annotation accuracy (precision and recall), editing efficiency (time), and user preferences.

In exemplary embodiments, the training process 300 is performed on the transcript 220 that already has a corrected transcript 230 in which potential errors W have been corrected. In other words, the potential errors W in transcript 220 have already been identified, labeled with corrections or possible corrections, and/or corrected. Corrected transcript 230 is a result of having made corrections to transcript 220.

In exemplary embodiments, the training process 300 allows the interface 200 ascertain (and the user to know) which tools 210 work best for different types of transcripts 220, for different portions of the transcript 220, and for various subject matters. The transcript 220 may represent varied, numerous transcripts and is not meant to be limiting. Using the training process 300 (and/or various factors discussed herein), the interface 200 displays (e.g., provides options) a set of tools 210 to the user that corresponds to the user's skill level, to the type of transcript 220 being edited, and/or to various portions of the transcript 220 being edited, along with other factors. The user may choose to select all or part of the tools 210 displayed by the interface 200. Additionally, the interface 200 can incorporate the training data (such as statistics) of training process 300 in determining the sequence T' of interface tools 210 with the maximum posterior probability.

Figure 4:
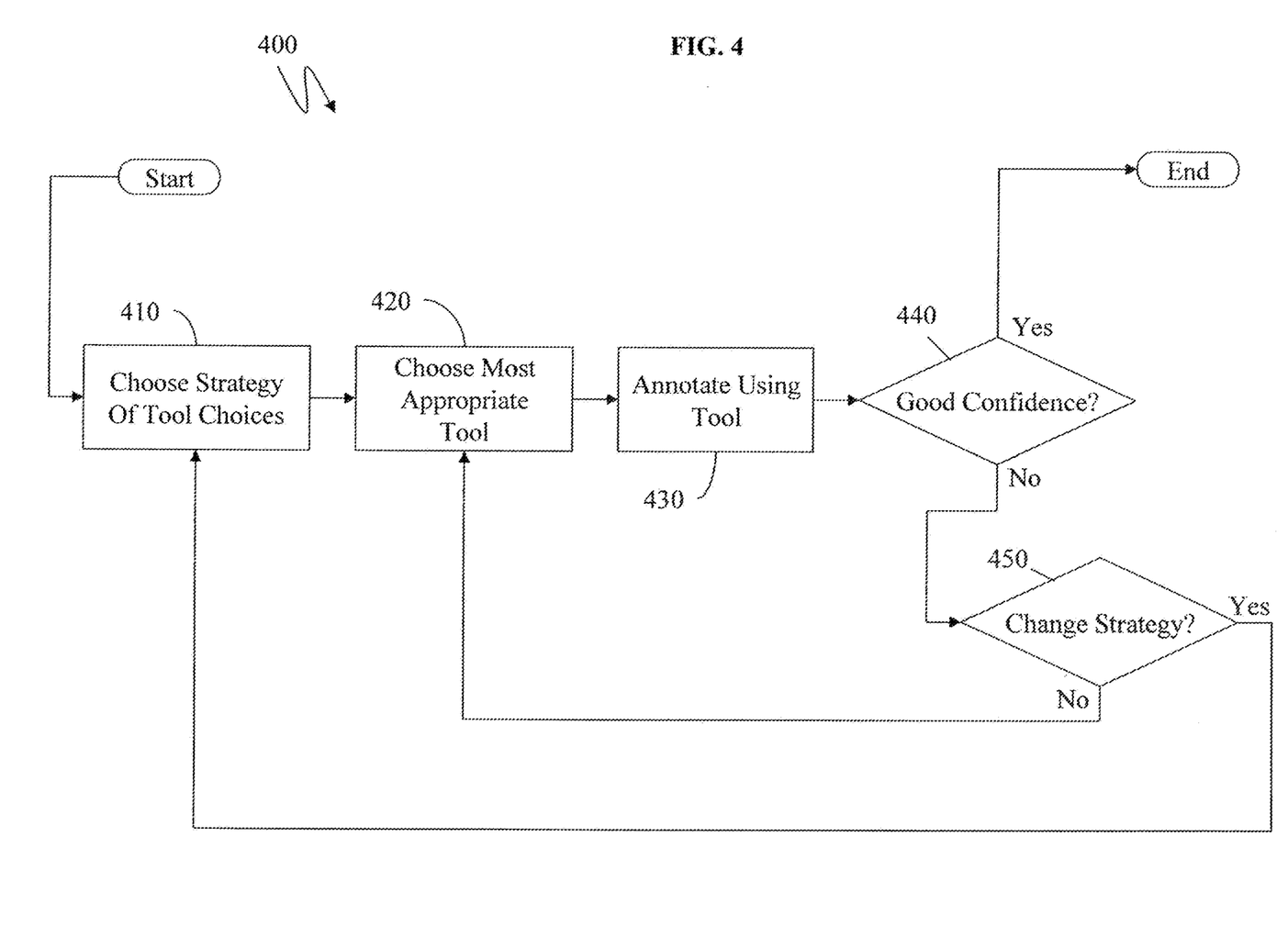
FIG. 4 illustrates a block diagram of a method of implementing strategies for selecting an editing tool and/or set of editing tools in accordance with exemplary embodiments.

FIG. 4 illustrates a block diagram of a method 400 of implementing strategies for selecting a tool or set of tools (e.g., 210) in accordance with exemplary embodiments. The method 400 identifies a strategy to determine which of the tools or set of tools contribute most to the annotation, editing, and correction process, and which of the tools or set of tools provide the most value in accordance with exemplary embodiments at 410. One methodology is to use maximum entropy as discussed herein.

In exemplary embodiments, the outcome of the strategy is to optimize the interface 200 using the complete path. The method 400 seeks to determine how to choose the next (appropriate) tool and/or set of tools, ultimately allowing the interface 200 to choose and present the correct sequence of tools T' to the user, according to the strategy at 420. The chosen tool is used to identify potential errors W and to annotate the transcript 220 at 430. If the confidence score is high, then the optimal path has been selected at 440 and the method ends. The optimal path reflects the sequence of tools which are applied. Moreover, the strategy for determining the optimal path may include the order of the tools for editing, which particular tools should be selected, and/or how many tools should be used. In determining the optimal path, the interface 200 may analyze potential options that the can be presented to the user editing the transcript. The optimal path may consider the particular order that the tools should be (nm) presented to the user editing the transcripts. As non-limiting examples, the optimal path may comprise a first tool, a second tool, and a third tool used in a combination determined by the interface 200.

If the confidence score is low, it might be desirable to change the strategy, to choose another tool, and/or add another tool at 440. If there are other tools in the strategy that have not been run, the strategy is not changed at 450 and other tools in the strategy are selected at the operation 420. If there are no other tools in the strategy that have not been run, the strategy needs to be changed at 450 to incorporate additional and/or different tools and/or to utilize a varied sequence of tools in operation 410. Moreover, the strategy may be updated dynamically during the editing process.

Further, in accordance with exemplary embodiments, consider non-limiting examples of a user interface 200 in which an editor has 6 different screens (each representing an available tool) available, and an automated "wizard" chooses one of the screens to enhance annotation capabilities. The goal is to automatically suggest to the editor which tool would be best to use next at each step of the editing process. In this non-example, assume there are 6 different types of tools, each with a different set of capabilities to understand, annotate, and suggest corrections:

Tool T0 displays the transcript topic along with detected named entities and terminology. Tool T1 displays alternative words with confidence scores. Tool T2 focuses on whole sentences, rather than individual words, thus enabling an editor to correct an entire sentence rather than editing word-by-word. Another tool, tool T6, allows a fully manual editing process, making no a priori assumptions or suggestions. The tools T2 through T5 have various editing capabilities as well.

Referring again to FIG. 1, the interface 160 evaluates each of these tools, independently. The interface 160 may choose and make active the tool that is most optimal to use in a specific situation. The optimal tool to use may also depend on the stage in the editing process, i.e., some tools may be more appropriate for fast global edits while other tools may be more appropriate for specific, individual transcript token edits. Furthermore, some tools may require more work from the editor, but provide more accurate outputs. Additionally, the decision about which tools to use can be based on outputs like the confidence scores produced by the tools as discussed herein.

Furthermore, in exemplary embodiments, as a transcript 130 becomes available, the tools may automatically evaluate word and sentence correctness. The tool may also decide which sections of the transcript are likely to be incorrect, highlights those sections to the user, and presents a set of alternative words and sentences via the interface 160.

Additionally, in accordance with exemplary embodiments, the transcript 130 can be presented to users who can make the necessary changes, and this activity then triggers activity of tools. For example, tool T0, can examine the transcript 130 and automatically annotate name entities and terminology associated with the topic of the transcript 130. The tool T0 can then summarize in a list and highlight those phrases for the user. If the user thinks one of those terms is incorrect, the word can be manually corrected. This correction then permeates the entire transcript 130.

Moreover, in accordance with exemplary embodiments, editing tools discussed herein can label a number of different features in a text. One tool can mark names, another tool can mark time, a third tool can mark terms, etc. Tools may also be considered in terms of which errors they are best at correcting. As non-limiting examples, one tool may cover more words where errors are typical. The interface can learn that there can be errors for terminology or names.

In accordance with exemplary embodiments, a predictor may be used for indicating which tools can correct most errors in a particular document (for example, for name or for time terminology.) The predictor comprises a process that allows predicting what is the best tool to use for the specific document. It will then be possible to conclude that for a particular topic, it is better to use a particular tool or group of tools.

In accordance with exemplary embodiments, the methods described herein determine an approach to identify which annotation is best to correct transcription errors in speech recognition or machine translation.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of editing on a computer, comprising:
receiving an input document for editing;
identifying a strategy for editing the document by the computer;
selecting editing tools to edit the document by the computer, wherein the document is a transcribed transcript of audio; and presenting the selected editing tools, wherein the identifying the strategy comprises determining which editing tools to select in editing the document and determining a sequence to present the editing tools to a user by the computer;
wherein the computer automatically determines which of the editing tools to present to the user to edit text of the transcript based on a time that each one of the editing tools requires to make corrections to the transcript.

2. The method of claim 1, further comprising automatically selecting which one of the editing tools to present to the user to edit the transcript based on whether the transcript is a transcription of at least one of a lecture, a news broadcast, and a conversation.

3. The method of claim 1, further comprising applying a plurality of factors for determining which editing tools to select in editing the document, the plurality of factors comprising:
subject matter of the document,
required time for editing the document,
user history,
nationality of the user,
accent of the user,
age of the user,
gender of the user,
native language of the user,
socioeconomic classification of the user,
educational level of the user,
emotional state of the user,
cost,
audio quality, and
efficiency for the respective editing tools, wherein the efficiency is based on training data for the respective editing tools.

4. The method of claim 1, further comprising:
comparing the strategy to a predefined confidence level; and
identifying another strategy if necessary based on the comparison.

5. The method of claim 3, further comprising updating the strategy dynamically while editing the document such that the strategy varies based on the plurality of factors.

6. The method of claim 1, wherein the selected editing tools are presented to the user in a sequence, such that the sequence for the editing tools provides an option for the user at each stage in the editing process, and wherein the user is identified such that editing tools are selected based on the identity of the user.

7. The method of claim 1, further comprising providing feedback to at least one of: the editing tools and a speech recognition system.

8. The method of claim 1, further comprising:
performing a training process in which the editing tools are tested against a training document that has previously been edited,
performing statistical analysis on the results of the testing of the editing tools to determine the accuracy of each of the editing tools, and
utilizing the statistical analysis in identifying the strategy.

9. The method of claim 1, further comprising, in response to the user making an edit to an error in the document, applying the edit to any other location that the error occurs in the document.

10. The method of claim 1, further comprising presenting at least one of:
a list of alternative words for a potential error in the document;
a list of sentences for the potential error in the document; and
a link to a corresponding audio segment for the potential error in the document.

11. A system for editing, comprising:
a processor for executing instructions;
a display; and
an interface configured to determine a strategy for editing a document via the processor, the interface selecting editing tools in accordance with the strategy, wherein the interface presents editing tools to a user on the display;
wherein the document is a transcribed transcript of audio; and
wherein the processor automatically selects which editing tools to present to the user to edit text of the transcript based on a time that each one of the editing tools requires to make corrections to the transcript.

12. The system of claim 11, wherein the strategy comprises which editing tools to select in editing the document and a sequence in which each of the editing tools is presented to the user on the display.

13. The system of claim 11, wherein the interface identifies another strategy if the strategy does not meet a predefined confidence level.

14. The system of claim 11, wherein the selected editing tools are presented to the user in a sequence, such that the sequence for the editing tools provides an option for the user at each stage of the editing process.

15. The system of claim 11, wherein the interface provides feedback to at least one of: the editing tools and a speech recognition system.

16. The system of claim 11, wherein:
each of the editing tools performs a training process in which the editing tools are tested against a training document that has previously been edited,
statistical analysis is performed on the results of the editing tools to determine the accuracy of each of the editing tools, and
the interface utilizes the statistical analysis in determining the strategy.

17. The system of claim 11, wherein in response to the user making an edit to an error in the document, the editing tools can apply the edit to any other location that the error occurs in the document.

18. A computer program product, tangibly embodied on a computer readable medium, for editing, the computer program product including instructions for causing a computer to execute a method, comprising:
receiving an input document for editing; identifying a strategy for editing the document;
selecting editing tools to edit the document;
presenting the selected editing tools;
wherein the document is a transcribed transcript of audio; and automatically selecting which editing tools to present to the user to edit text of the transcript based on a time that each one of the editing tools requires to make corrections to the transcript.

19. The computer program product of claim 18, wherein the step of identifying a strategy comprises determining which editing tools to select in editing the document and a sequence in which each of the editing tools is presented to a user.

20. The computer program product of claim 18, wherein the interface identifies another strategy if the strategy does not meet a predefined confidence level.

* * * * *